July 5, 1955   J. BLEARS   2,712,399
APPARATUS FOR OBTAINING DESIRED QUANTITIES OF A GAS
Filed Feb. 2, 1953

Inventor:
Jack Blears,
by Paul A. Frank
His Attorney.

United States Patent Office 2,712,399
Patented July 5, 1955

2,712,399

APPARATUS FOR OBTAINING DESIRED QUANTITIES OF A GAS

Jack Blears, Davenham, England, assignor to Metropolitan-Vickers Electrical Company Limited, a British company Application February 2, 1953, Serial No. 334,566

4 Claims. (Cl. 222—3)

This invention relates generally to apparatus for obtaining desired quantities of gas. The apparatus is referred to herein as a manometer.

The invention has an important application in controlling the volume and pressure of gas samples supplied to analysing apparatus such as a mass spectrometer.

The present invention includes an apparatus for obtaining a desired quantity of gas by filling a metering chamber with a gas, balancing the gas pressure against a column of displaced liquid and causing excess gas to escape from the metering chamber when the liquid is displaced a predetermined amount. A desired quantity of gas then remains within the metering chamber and may be utilized in various ways.

The invention in one of its specific aspects also comprises apparatus which includes a U-shaped duct or the equivalent having a sealing liquid around the lower bend, means for connecting one upright limb, which acts as the metering chamber, either with a gas supply or with a utilizing apparatus, and an escape duct having at its lower end a filter permeable to the gas but not to the sealing liquid and leading from below the normal surface of the liquid near the bend of the limb to an evacuating source, the arrangement being such that when gas is admitted to the first limb the liquid is displaced into the second limb until the excess gas spills into the escape duct.

Preferably, means are provided for adjusting the normal level of the sealing liquid so as to control the amount of displacement necessary before the excess gas spills into the evacuated escape duct and thereby control the pressure of the gas.

As above mentioned, the invention has an important application in supplying measured quantities of gas to analysing apparatus such as a mass spectrometer, and in this connection two or more sets of apparatus as described above may be connected into a gas system feeding the analysing apparatus and provided with multi-way valves, whereby samples of different types of gas may as desired be fed to the analysing apparatus.

In order that the inventoin may be clearly understood reference will now be made to the accompanying drawing, in which.

Figure 1:
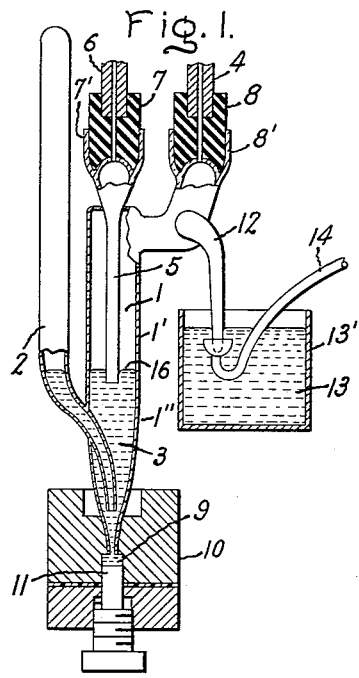
Fig. 1 shows diagrammatically and partially in section a suitable form of manometer apparatus embodying the invention.

In Fig. 1 numeral 1 indicates a gas metering chamber formed by one upright limb 1' of an essentially U-shaped duct 1", numeral 2 represents a second upright limb, which may or may not be sealed from the atmosphere at its upper end, and numeral 3 designates a sealing liquid such as mercury. In the embodiment shown the lower end of the limb 2 is inserted into the liquid 3 and is arranged concentrically within the lower end of the limb 1'. It follows, therefore, that downward displacement of liquid in the limb 1' causes a corresponding upward displacement in the limb 2, and hence these two limbs are the hydraulic equivalent of a U-shaped duct having sealing liquid around the lower bend.

Figure 2:
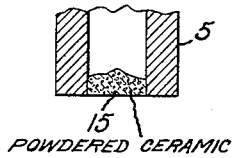
Fig. 2 is a section to an enlarged scale of a portion of the escape duct in the apparatus shown in Fig. 1.

Leading from the upper end of the limb 1' is a pipe 4 which connects to an analysing or other utilization apparatus (not shown). A capillary tube 5 is inserted downwardly through the limb 1', and normally its lower end extends below the surface of the sealing liquid as shown. As is illustrated more clearly in Fig. 2, the lower end of the capillary tube 5 is provided with a filter 15 of a suitable substance which is permeable to the gas but not to the sealing liquid employed, such as ceramic. The upper end of the capillary tube 5 is connected through a pipe 6 with vacuum pumping apparatus (not shown). The pipes 4 and 6 can be suitably sealed in removable fashion by means of rubber washers 7 and 8 retained in sealing relationship by means of cups 7' and 8', respectively; or the pipes can be permanently attached in air-tight relation by well-known means such as soldering, etc. The lower end of the duct 1" extends into a chamber 9 formed in a block 10, and a plunger 11 may be adjustably screwed up into this chamber so as to control the height of the sealing liquid in the limb 1'.

For introducing gas into the limb 1' and chamber 1 there is provided a downwardly extending duct 12, the lower end of which extends below the surface of sealing liquid 13, e. g. mercury, that is contained within a suitable vessel 13'. Gas samples may be introduced by placing the end of a gas feed line, shown as 14, against the lower end of the duct 12 so as to form a temporary joint, the mercury 13 acting as a sealing agent.

In measuring a quantity of gas with this apparatus the pipe or duct 4 is first closed by suitable means such as a valve (not shown). Gas is then introduced into the limb 1' by way of the supply pipe 14 and the tube 12. Introduction of this gas causes the meniscus 16 of the mercury to fall and consequently the mercury in limb 2 rises. This continues until the meniscus 16 falls below the lower end of the capillary tube 5. When this occurs, excess gas spills into the capillary tube or duct 5 which, as above mentioned, can be evacuated. At this time the supply of gas through the line 14 should be arrested, and any excess gas is pumped away through the pipe or duct 6 until the mercury meniscus 16 just reaches the lower end of the capillary tube 5. When this occurs the gas in the limb 1 is at a known volume and pressure, and this may then be delivered to the analysing apparatus, which, for example, may be a mass spectrometer (not shown), by opening the duct 4 and allowing the gas sample to pass therethrough.

It will be appreciated that with this apparatus the volume of the gas sample is fixed but that the pressure may be adjusted by adjusting the height of the plunger 11. This, by varying the level of the mercury, controls the amount by which the mercury must be displaced for gas to spill into the capillary tube 5. Clearly, the higher the initial level of the mercury meniscus 16, the greater the amount of displacement of the mercury that is necessary, and hence the greater the gas pressure which will build up before the mercury is displaced.

Figure 3:
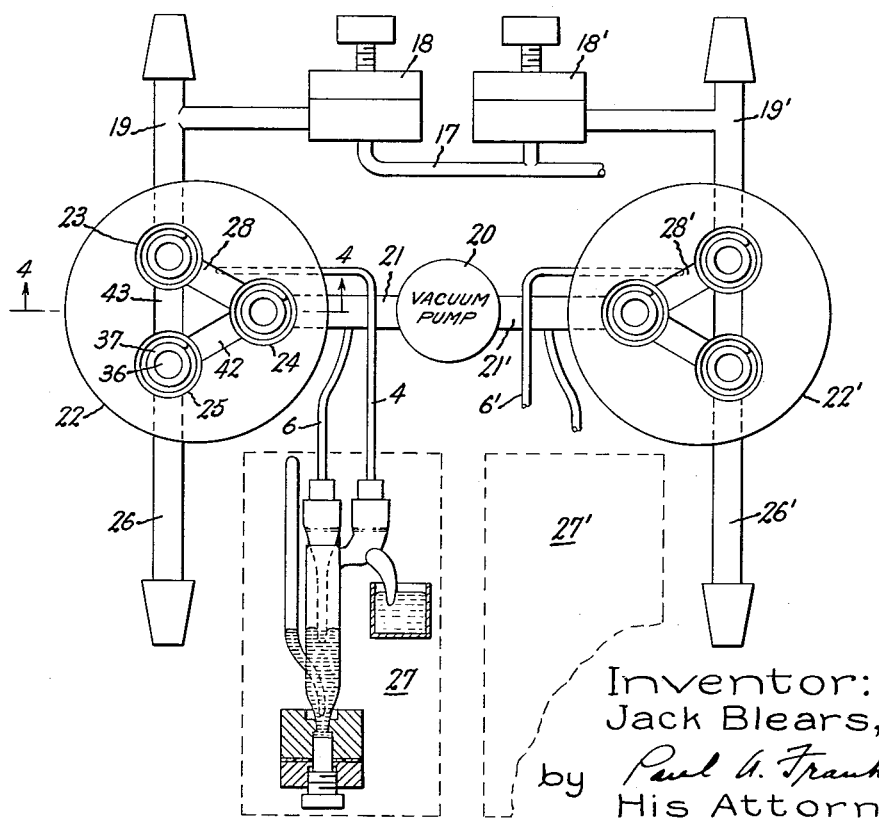
Fig. 3 shows how two manometers of the type shown in Fig. 1 may be combined into a gas system for alternatively supplying samples of gases to an analysing apparatus, the valve assemblies in the system being illustrated with the covers removed along line 3—3 of Fig. 4.

In the gas system shown in Fig. 3, the mass spectrometer (not shown) is assumed connected to the delivery pipe 17 which, in turn, is connected through leak valves 18 and 18' to each of the ducts 19 and 19'. The upper ends of these ducts are assumed connected in air-tight relation to respective reservoirs (not shown). The reference 20 indicates an evacuating or vacuum pump which is connected to a vacuum duct 21. The reference 22 indicates a three-way valve assembly, a preferred form of which is more fully illustrated in Fig. 4; this includes three individual valves 23, 24, 25, which may be manipulated to provide connection between any pair of ducts 19, 21 and 26. The duct 26 is a supply duct, the purpose of which will be explained later. Similarly valve assembly 22' provides connection between any pair of the ducts 19', 26', and 21'. The manometers are indicated generally by the references 27, 27', the manometer 27' being indicated by a dotted rectangle only. The evacuating pipes 6 and 6' are connected directly to the vacuum ducts 21 and 21', respectively, while the pipe 4 is connected through connecting valves 23 and 24 in the valve assembly 22. Similarly the pipe 6' is connected to a passage 28' in the valve assembly 22'.

Figure 4:
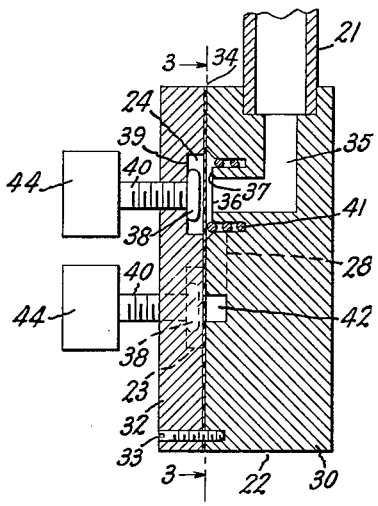
Fig. 4 is a section view of a complete valve assembly utilized in the system of Fig. 3 and taken along line 4—4 thereof.

The valve assembly shown particularly in Fig. 4 comprises a cylindrical body portion 30 and a cover 32, both of which are preferably of a suitable non-corrodible metal such as stainless steel. The contiguous surfaces of body portion 30 and cover 32 are accurately machined and held together by screws 33, one of which is illustrated. Between the cover and the body portion is sandwiched a flexible diaphragm 34 which may be of a suitable plastic material such as polyethylene or, alternatively, of non-corrodible metal such as stainless steel or beryllium-copper. In the latter case it will usually be necessary to employ an O-ring gasket (not shown) between the valve body and the cover to seal the internal passages from the atmosphere, suitable material for such gaskets being soft aluminum or lead.

Each of the ducts 19, 21 and 26 respectively leads to right-angle ducts 35 terminating in ports 36 surrounded by seats 37. Diaphragm 34 extends over seats 37 with a slight clearance in its unstressed position. On the side of the diaphragm remote from the seats and opposite each port 36 are pressure pads 38 located in recesses 39 and carried on the end of screwed spindles 40 engaging with internal threads in the cover. Each pad 38 can be caused by the respective screwed spindle to press the diaphragm against the associated seat 37 so as to close the associated port 36, or can be caused by the screwed spindle to open the port by removing pressure against the diaphragm. Springs 41 in channels surrounding each port 37 ensure that the diaphragm uncovers the seat when the associated port is opened. Channels 28, 42 and 43 in the body portion 31 interconnect respective recesses 39. When a port 36 is open, communication is established between the duct 35 in question and both channels connected to the associated recesses 39. Thus, by suitable manipulation of the control knobs 44 for the pressure pads, any pair of ducts can be interconnected. For example, if the port shown in full in Fig. 4 is closed and the remaining ports opened, ducts 19 and 26 will be interconnected and duct 21 will be cut off. Clearly, communication may similarly be effected between the other pairs of ducts or all three ducts simultaneously.

Leak valves 18 and 18' may be of the type disclosed and claimed in my copending application Serial No. 328,494, filed jointly with Kenneth Heathcote on December 29, 1952 and assigned to the assignee of the present application. In general, such valves comprise a restriction duct having a flexible metal diaphragm extending laterally across the end thereof with a slight clearance. A pressure pad or bearing member is arranged to be able to press the diaphragm against the end or seat of the restriction duct to affect the gas flow therethrough.

In one way of operating the system of Figs. 3 and 4, all the valves in the system are closed initially, and the manometer 27 is operated as described in connection with Fig. 1. The valve 23 is then opened to supply the sample to the reservoir, after which it is closed and the leak valve 18 opened to pass the sample from the reservoir to the analysing apparatus. In a similar manner a sample can be supplied by manometer 27' through valve assembly 22'. Such a method can be used for alternately supplying hydrocarbon samples to a mass spectrometer.

As illustrated in the drawing, various portions of the apparatus of the invention are preferably constructed of metal. It is, however, within contemplation of the present invention that the essentially U-shaped duct 1" and the several interconnecting pipes may be composed of glass if desired.

While particular embodiments of the invention have been shown and described, it will be obvious to those skilled in the art that various changes and modifications may be made without departing from the invention in its broader aspects and it is, therefore, intended in the appended claims to cover all such changes and modifications as fall within the true spirit and scope of this invention.

What I claim as new and desire to secure by Letters Patent of the United States is:

1. Apparatus for obtaining desired quantities of gas comprising an upright essentially U-shaped duct having at least one limb sealed from the atmosphere, a gas escape duct projecting downwardly within said one limb from the exterior thereof and terminating above the band of said essentially U-shaped duct, a quantity of sealing liquid within said essentially U-shaped duct and having a meniscus in said one limb normally above the inner end of said gas escape duct, means for adjusting the normal level of said meniscus to a selected position above the inner end of said gas escape duct, means for admitting gas to said one limb above said meniscus of said sealing liquid until said meniscus lowers from its selected normal level to the inner end of said escape duct whereby a constant volume of gas at a desired pressure is provided within said one limb, and means for removing said gas from said one limb for utilization.

2. Apparatus as in claim 1 in which both of the limbs of said essentially U-shaped duct are sealed from the atmosphere.

3. Apparatus as in claim 1 in which the inner end of said escape duct is provided with a filter permeable to gas but not to said sealing liquid.

4. Apparatus as in claim 3 in which means are provided for the evacuation of said escape duct.

References Cited in the file of this patent
UNITED STATES PATENTS

| | | |
|---|---|---|
| 1,786,626 | Lohman | Dec. 30, 1930 |
| 2,143,492 | Morse | Jan. 10, 1939 |
| 2,499,917 | Harper | Mar. 7, 1950 |

FOREIGN PATENTS

| | | |
|---|---|---|
| 817,969 | Germany | Oct. 22, 1951 |